United States Patent [19]

Vuorio

[11] Patent Number: 4,518,644
[45] Date of Patent: May 21, 1985

[54] PAPER MACHINE SCREEN

[75] Inventor: Tauno A. Vuorio, Zurich, Switzerland

[73] Assignee: Siebtuchfabrik AG, Olten, Switzerland

[21] Appl. No.: 969,359

[22] Filed: Dec. 14, 1978

[30] Foreign Application Priority Data

Dec. 15, 1977 [CH] Switzerland ............................ 015417

[51] Int. Cl.³ .............................................. B32B 27/14
[52] U.S. Cl. .............................. 428/198; 162/DIG. 1;
428/195; 428/229; 428/245; 428/257; 428/258
[58] Field of Search ..................... 162/348, DIG. 1;
139/425 A, 383 A; 428/229, 245, 257, 258, 195, 198

[56] References Cited

U.S. PATENT DOCUMENTS

| | | | |
|---|---|---|---|
| 3,140,973 | 7/1964 | Johnson | 139/425 A |
| 3,216,893 | 11/1965 | Schuster | 139/425 A |
| 3,603,354 | 9/1971 | Lee et al. | 139/425 A |
| 3,632,068 | 1/1972 | Weir et al. | 139/425 A |
| 3,705,079 | 12/1972 | Lee et al. | 139/425 A |
| 3,851,681 | 12/1974 | Egan | 139/425 A |
| 3,858,623 | 1/1975 | Lefkowitz | 139/425 A |
| 4,041,989 | 8/1977 | Johansson et al. | 139/425 A |
| 4,071,050 | 1/1978 | Codornea | 139/425 A |

Primary Examiner—James J. Bell
Attorney, Agent, or Firm—Shlesinger Arkwright Garvey & Fado

[57] ABSTRACT

A single layer paper machine screen fabric having longitudinal and transverse threads characterized by the fact that either the longitudinal or the transverse threads are positioned to change the direction of their course diagonally in the plane of the fabric. The center line of such threads is offset from the direction of their course by at least half the thread diameter.

19 Claims, 4 Drawing Figures

PAPER MACHINE SCREEN

The invention is concerned with a single-layer paper machine screen in multiple shaft binding, particularly for the wet end.

The term "paper machine" is to be understood in a liberal meaning and encompasses also for instance cellulose and tissue machines, dehydrating devices for the manufacture of asbestos boards and similar equipment comparable with that used in the manufacture of paper.

Likewise is the term "thread" used in the following to be generally conceived in the meaning applicable to the weaving of screening cloth and extends particularly also to plastic monofilaments as well as to metal wires.

High demands are made on paper machine screens. In order to be able to meet these demands as far as possible which demands are partly hard to reconcile with each other, numerous fabric constructions for screening cloth have already been developed without having found, however, a generally satisfying solution.

Thus are known for instance multiple-layer, particularly double-layer paper machine screens which offer, compared to the customary single-layer screens, various advantages but which are in their manufacture complicated and expensive and in operation rather delicate, particularly as far as the necessity of keeping them clean is concerned.

The invention has therefore set itself the task of creating a single-layer paper machine screen which distinguishes itself by high stability, wear resistance and dehydrating efficiency. Furthermore a favorable influence upon the sheet formation is striven for, and the screen ought to be also capable of being produced at low cost.

Another object of the invention is the development of a one-layer paper machine wire—preferably woven from monofilaments, especially plastic monofilaments—which has a maximum thickness, a maximum inner volume, and a minimum open area (in vertical sight), this area being nevertheless greater than zero.

It is common to all known fabrics used for paper machine screens—without regard to the number of shafts used or to the binding—that the longitudinal and xx cross threads are not or only slightly dislodged at the points of intersection by the threads running close by, therefore do not change their direction of course in the horizontal plane.

In contrast to this is the paper machine screen according to the invention characterized in that its longitudinal and/or transverse threads change the direction of their course intermittently in the plane of the fabric, in which arrangement the center line of the thread in question is offset by at least half the thread diameter in this plane.

p Whereas in customary screen constructions the threads run essentially only lengthwise, crosswise and up and down respectively, is therefore added with the diagonal a fourth direction or dimension in case of the screen according to the invention. Thereby obtains the paper machine screen the following important advantages:

(1) The stability of the screen construction is increased by the four-dimensional triangle construction of the threads. This property can be even more enhanced in a manner known in itself by finishing by which the nodal points of the threads are fixed by means of appropriate chemicals.

The screen distinguishes itself on account of its construction particularly by an extraordinarily high transverse rigidity which is at least as high as in double-layer screens. If in addition a thick cross transverse thread is selected, a stability can be acheived which was unobtainable up to the present for single-layer paper machine screens.

(2) The change of the direction of course of the longitudinal threads in the horizontal plane brings about advantages in the sheet formation of the paper fleece since it increases the retention of the fiber material.

(3) The screen according to the invention has on account of the more favorable woof-length gradient a higher wear resistance. The transverse threads are preponderantly located on the bottom, i.e., on the machine side, and in the paper machine are therefore subject to abrasion the transverse threads, and the longitudinal threads which carry the tensile load will not lose their strength.

(4) By appropriate selection of the number and thickness of the threads a satisfactory freedom from markings can be acheived.

(5) The screen can be easily kept clean.

Further characteristics and advantages of the invention ensue from the following description and the subclaims.

The invention is explained in more detail in the following on the basis of the drawing.

FIG. 2a is seen in the machine direction and FIG. 2b in transverse direction.

Figure 1:
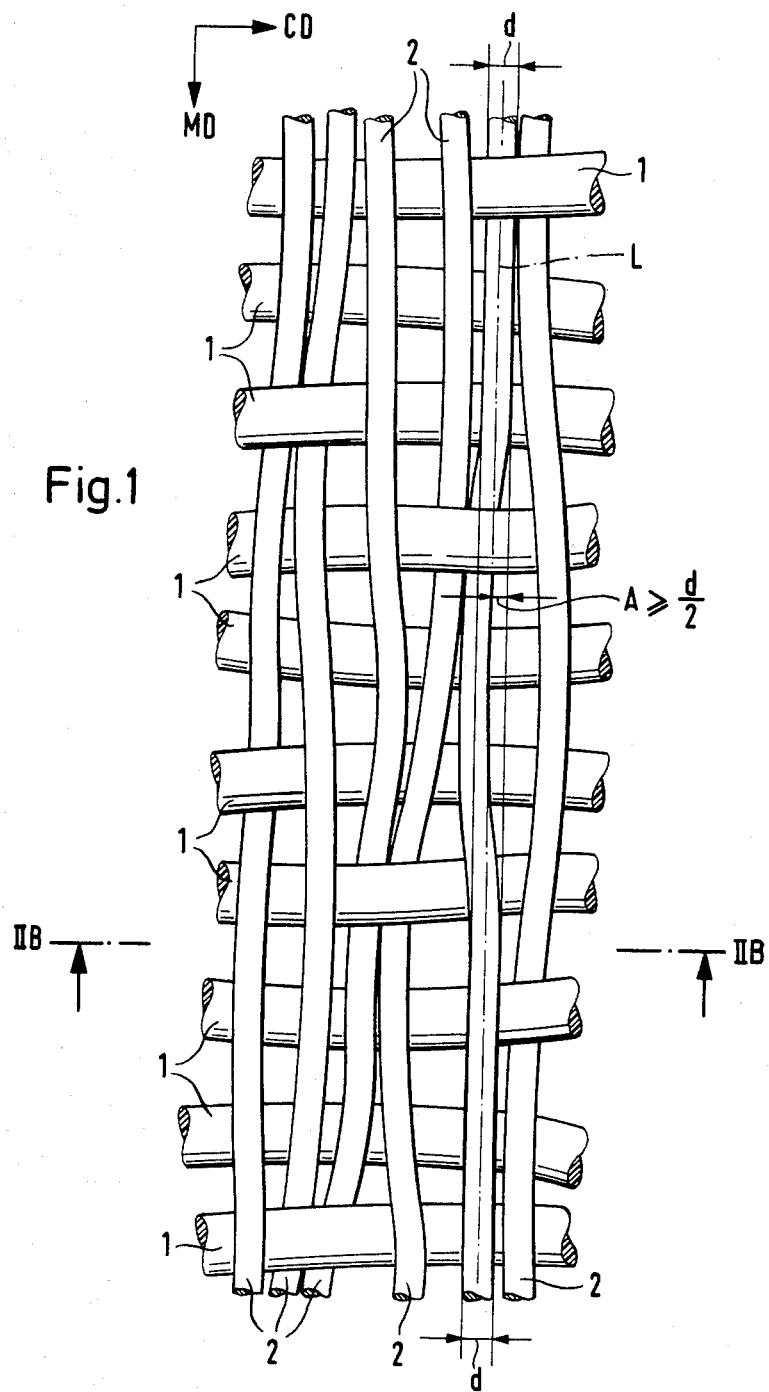
FIG. 1 shows in schematic representation a segment of a screen according to the invention.

In the FIG. 1 have been brought together two points in the middle of a longitudinal thread with a line L. Between these two points the deviation A of the thread in its direction of course from the line L $\geq$ than half of the thread diameter.

Figure 2A:
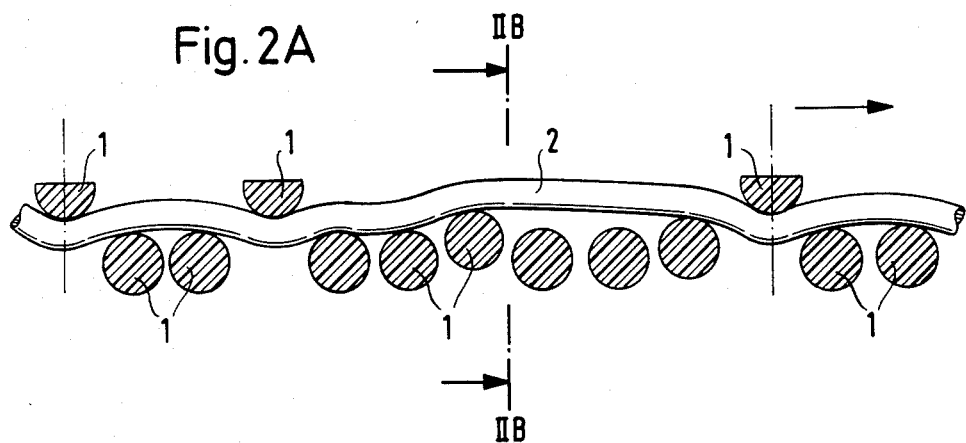
FIGS. 2a and 2b are cross sections through a screen according to a preferred form of execution of the invention, in which representations
Figure 2B:
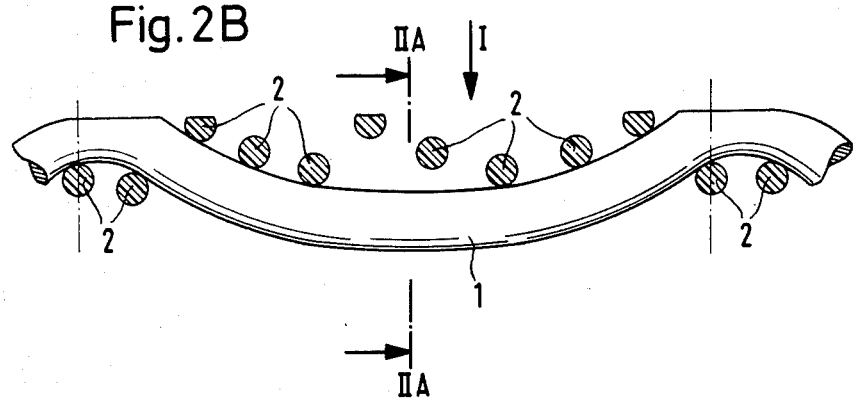
Figure 3:
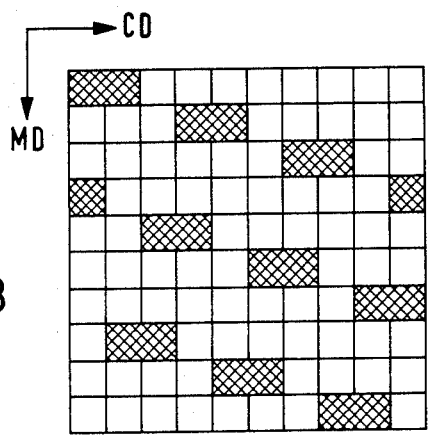
FIG. 3 is a representation of the binding pattern of the screen according to FIG. 2a and 2b respectively as seen from the upper side of the fabric.

In the FIGS. 2 and 3 is displayed the screen according to the preferred form of execution in detail.

In the FIGS. 2a and 2b are the transverse threads designated with the position 1 and the longitudinal threads with the position 2. As can be seen, run in the longitudinal direction (FIG. 2a) always alternating one transverse thread above, two transverse threads below, one transverse thread above and six transverse threads below a longitudinal thread, with the arrangement repeating itself, whereas in transverse direction eight longitudinal threads run always alternating above and two longitudinal threads below a transverse thread etc.

The binding pattern according to FIG. 3 allows to recognize that the fabric has to be generally designated as atlas (satin) with the provision however that stepwise two threads are tied in pairs. Since it is here the question of a screen of single-layer construction, only the top side of the fabric has to be shown; the bottom side is analogous. The longitudinal threads are combined in pairs consecutively progressing by one longitudinal thread for each binding point. Thereby run for each row of meshes in a permuting manner the longitudinal threads twice straight in parallel to the machine direction and once length-diagonal, or—in other words—each straight thread course is followed by an oblique one. Here and in the following this screen is characterized as ten-shaft diagonal screen.

The warp threads run in the form of execution shown as an example in longitudinal or a machine direction and the woof threads at right angles to them, so that a seam joint is needed. It is however also possible to weave the screen endless, so that the woof runs in longitudinal and the warp in transverse direction.

The data on the screen according to the example of execution are compiled in the following table and supplemented by measured values of its most important properties (column I). The threads consist here of a plastic monofilament.

For the sake of comparison are indicated the corresponding data and measured values of a known screen in five-shaft atlas binding (column II) and of a known screen in four-thread cross-twill satin binding (column III) which have the same permeability to air of 2000 $l/m^2$. sec and about the same warp number with the same warp thread diameter. In order to attain the highest possible fineness and little marking respectively and nevertheless a comparable rigidity, a thread of small diameter has been used as woof but the woof number has been increased.

The weight per square meter of the new screen construction is about 53% higher than in four-shaft screens and the thickness of the screen is about double. This guarantees a substantially longer running time.

The open area lies with 9% evidently below that of the four- and five-shaft screens, whereby high retention is acheived. Since on the other hand the open area is not like in two-layer screens equal to zero but greater than zero, fouling and clogging of the screen are slight.

The screen distinguishes itself by outstanding operational stability and high longitudinal stability. By the diagonal longitudinal-thread sections good retention and easier sheet removal are assured. The danger that fibers penetrate into the interior of the screen is thus significantly reduced.

The inner construction of the screen is in contrast to the double-layer screen very clear and simple, whereby the danger of fouling is reduced, since fibers can not be caught as easily in the screen as in the other. Furthermore can the spraying pipes do a better job of cleaning the screen in the interior.

The inner free volume in the screen is almost twice as large as in the four-shaft screens. This guarantees in spite of a small open area an excellent dehydration which is superior to that in the previous screens. Better formation, higher CMT-values, uniform strength and faster operational speed of the machine can be acheived by the higher dehydration.

The ten-shaft diagonal screen can be characterized as a combination of the advantages of a single-layer with those of a double-layer screen.

Screens according to the invention have been tested for more than a year on large and small equipment, in which tests the observations represented in the following could for instance be made on a tissue machine with a suction-box roll:

In this type of machinery is the paper sheet formed on a stretch of 25 to 30 cm within about 0.015 sec. The following demands are made on the screen:

(A) Good braking action on the watery fiber suspension striking the screen
(B) Good retention
(C) Good dehydration efficiency All these demands are met with the screen construction according to the invention, Point (A) by the consecutively arranged threads (in the above example eight) lying perpendicularly to the direction of course. Only the ninth and tenth transverse threads are tied together with one of the threads running in longitudinal direction. These transverse threads which in this example of execution lie mostly on the top side, i.e., on the paper side of the screen, change their direction of course in the manner described above.

This continuous change in the direction of course of the transverse threads favors curling of the fibers in the sheet formation. By having the ninth and tenth transverse threads drawn together by the longitudinal thread the route of the longitudinal thread on the top side of the screen is reduced to a minimum, and the transverse threads exert thereby an optimal braking action in the formation.

Point (B), the retention, is with the screen construction according to the invention considerably increased on account of the small vertical open area. With the dehydrating efficiency remaining constant, the single-layer screen constructions possess the following open, vertical surface amounts relative to a triple twill = 100: quadruple twill binding 87, quintuple twill binding 59 and ten-shaft diagonal screen only 30.

TABLE

|  |  | I | II | III |
|---|---|---|---|---|
| Warp number | (cm$^{-1}$) | 24.0 | 24.1 | 24.2 |
| Woof number | (cm$^{-1}$) | 14.8 | 22.0 | 18.0 |
| Warp diameter | (mm) | 0.25 | 0.25 | 0.25 |
| Woof diameter | (mm) | 0.45 | 0.30 | 0.30 |
| Thickness | (mm) | 1.09 | 0.65 | 0.60 |
| Weight | (g · m$^{-2}$) | 541 | 407 | 352 |
| Open area | (%) | 9.3 | 13.5 | 17.6 |
| Free volume | (mm$^3$ · cm$^{-2}$) | 69.6 | 45.5 | 37.0 |
| Permeability to air | (l · m$^{-2}$ · sec$^{-1}$) | 2000 | 2000 | 2000 |
| Rigidity | (p · cm$^{-1}$) | 360 | 105 | 77 |
| Expansion | (%) | 1.17 | 1.23 | 1.35 |
| Volume of abrasion | (mm$^3$ · cm$^{-2}$) | 10.5 | 8.1 | 7.3 |
| Thickness of abrasion | (mm) | 0.41 | 0.32 | 0.28 |

Point (C) is guaranteed by the larger interior volume of the screen construction according to the invention. The thickness of the screen is at the same time increased with the thread diameter remaining constant. This increase of the interior volume raises the specific dehydrating performance of this screen construction by 12% or more compared to all single-layer screen constructions known up to date.

All positive properties mentioned above of the screen construction according to the invention apply in like manner to double-screen tissue machines. Additionally has to be considered the higher inherent stability of shape of this screen construction which in this kind of paper machines of great importance for the sheet formation.

Another ten-shaft diagonal screen with a dehydrating capacity of $2 \times 2000$ $l/m^2$.sec and an open area of 5% can be produced with warp threads of 0.25 mm diameter and a warp number of 24 per cm and with woof threads of 0.20 mm as well as a woof number of 27 per cm.

What is claimed is:

1. A single-layer paper machine screen fabric of multiple shaft weave, particularly adapted for use at the wet end of a paper machine and characterized in that the longitudinal or, alternatively, the transverse threads of said fabric change their direction of course intermittently in the fabric plane, whereby the center line of such thread is offset from its direction of course by at least half the thread diameter in the fabric plane.

2. The paper machine screen of claim 1 characterized by the fact that the threads which change their direction of course contact adjacent ones of such threads.

3. The paper machine screen of claim 1 or 2 characterized by the fact that the transverse threads are of greater thickness than the longitudinal threads.

4. A single-layer paper machine screen fabric of multiple shaft weave particularly adapted for use at the wet end of a paper machine and characterized in that the longitudinal or, alternatively, the transverse threads of said fabric change their direction of course intermittently in the fabric plane, whereby the center line of such thread is offset from its direction of course by at least half the thread diameter in the fabric plane, and threads of the screen fabric are affixed at nodal points by means of chemical treatment.

5. The paper machine screen of claim 1 or 2 characterized by the fact that the screen fabric is woven from plastic monofilaments.

6. The paper machine screen of claim 1 or 2 characterized by the fact that the screen fabric is woven from plastic monofilaments and the transverse threads run primarily on the bottom side of the screen cloth.

7. The paper machine screen of claim 1 or 2 characterized by the fact that it is a tenshaft weave fabric.

8. The paper machine screen of claim 1 or 2 characterized by the fact that it is woven in the transverse direction in a pattern of two adjacent transverse shafts above the longitudinal threads and eight consecutive transverse threads below the longitudinal threads shafts.

9. The paper machine screen of claim 1 or 2 characterized by the fact that it is woven in longitudinal direction in a pattern of one longitudinal thread above two transverse threads and the adjacent one longitudinal thread above six transverse threads.

10. The paper machine screen of claim 1 or 2 characterized by the fact that the transverse threads are of greater thickness than the longitudinal threads, the screen fabric is woven from plastic monofilaments and the transverse threads run primarily on the bottom of the screen cloth.

11. The paper machine screen of claim 1 or claim 4 wherein the transverse threads of said fabric change their direction of course intermittently in the fabric plane.

12. A single-ply multiple shaft Atlas weave paper making machine screen, comprising:
   (a) a plurality of longitudinal threads having a direction of course generally oriented with the machine direction and a plurality of cross threads having a direction of course essentially transverse thereto;
   (b) said longitudinal and cross threads being selectively interwoven and forming interlacing points and thereby providing said screen;
   (c) a first one of said longitudinal and cross threads is bound to an adjacent one of said longitudinal and cross threads at a first one of said interlacing points and thereby laterally shifts said first one thread from said direction of course;
   (d) said first one thread is bound to another adjacent one of said longitudinal and cross threads at a second one of said interlacing points for thereby laterally shifting said first one thread to said direction of course;
   (e) said first one thread is shifted at said interlacing points a distance exceeding ½ the diameter of said first one thread; and,
   (f) said cross threads have a diameter greater than said longitudinal thread diameter.

13. The screen as defined in claim 12, wherein:
   (a) said screen is woven as a ten shaft weave fabric.

14. The screen as defined in claim 13, wherein:
   (a) in one weaving repeat a first one of said cross threads extends over two adjacently disposed longitudinal threads and extends under eight adjacently disposed longitudinal threads; and,
   (b) in one weaving repeat a first one of said longitudinal threads extends underneath one cross thread, extends over two adjacently disposed cross threads, extends under one cross thread and extends over six adjacently disposed cross threads.

15. The screen as defined in claim 12, wherein:
   (a) said cross threads and said longitudinal threads comprised of a polymeric material.

16. The screen as defined in claim 12, wherein:
   (a) said longitudinal and cross threads are fixed at said interlacing points by chemical treatment means.

17. The screen as defined in claim 12, wherein:
   (a) a first one of said longitudinal threads is bound to an adjacent longitudinal thread.

18. The screen as defined in claim 17, wherein:
   (a) said cross thread run primarily on the bottom of said screen.

19. The screen as defined in claim 12, wherein:
   (a) said first one thread is laterally shifted in the screen plane.

* * * * *